US012781811B2

(12) United States Patent
Yoon

(10) Patent No.: US 12,781,811 B2
(45) Date of Patent: Nov. 3, 2026

(54) BRAKE DEVICE AND VEHICLE INCLUDING THE SAME

(71) Applicant: HYUNDAI MOBIS CO., LTD., Seoul (KR)

(72) Inventor: Bo Ram Yoon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 350 days.

(21) Appl. No.: 18/437,559

(22) Filed: Feb. 9, 2024

(65) Prior Publication Data

US 2025/0035171 A1 Jan. 30, 2025

(30) Foreign Application Priority Data

Jul. 25, 2023 (KR) ........................ 10-2023-0096587

(51) Int. Cl.

| | |
|---|---|
| ***F16D 65/00*** | (2006.01) |
| ***B60T 13/74*** | (2006.01) |
| ***F16D 55/226*** | (2006.01) |
| ***F16D 55/2265*** | (2006.01) |
| ***F16D 65/095*** | (2006.01) |
| ***F16D 65/18*** | (2006.01) |
| *B60T 1/06* | (2006.01) |
| *F16D 55/00* | (2006.01) |
| *F16D 121/24* | (2012.01) |
| *F16D 125/40* | (2012.01) |

(52) U.S. Cl.

CPC ........ *F16D 55/2265* (2013.01); *B60T 13/746* (2013.01); *F16D 55/226* (2013.01); *F16D 65/0068* (2013.01); *F16D 65/095* (2013.01); *F16D 65/18* (2013.01); *F16D 65/183* (2013.01); *B60T 1/065* (2013.01); *F16D 2055/0008* (2013.01); *F16D 2121/24* (2013.01); *F16D 2125/40* (2013.01)

(58) Field of Classification Search

CPC ........... F16D 2055/0008; F16D 65/183; F16D 65/18; F16D 65/095; F16D 65/0068; F16D 55/2265; F16D 55/226; B60T 13/746; B60T 1/065

See application file for complete search history.

(56) References Cited

U.S. PATENT DOCUMENTS

2020/0309214 A1* 10/2020 Al-Mahshi ............ F16D 65/183
2022/0212648 A1* 7/2022 Kim ...................... B60T 13/588
2023/0012601 A1* 1/2023 Gerber .................. B60T 13/745

* cited by examiner

*Primary Examiner* — Tinh T Dang
(74) *Attorney, Agent, or Firm* — Morgan Lewis & Bockius LLP

(57) ABSTRACT

A brake device includes a caliper body, a brake pad disposed at one side of the caliper body, and a pad propulsion unit seated in the caliper body to press one surface of the brake pad. The pad propulsion unit includes a conversion assembly configured to convert rotational movement into rectilinear movement, a balance bar rotatably connected to one side of the conversion assembly, and at least two pressurizers coupled to the balance bar and coming into contact with the one surface of the brake pad. The brake device evenly distributes pressure to one surface of the brake pad through the balance bar coupled to the plurality of pressurizers, thereby improving surface pressure of the brake pad.

9 Claims, 11 Drawing Sheets

(a)

(b)

BRAKE DEVICE AND VEHICLE INCLUDING THE SAME

This application claims the benefit of Korean Patent Application No. 10-2023-0096587, filed on Jul. 25, 2023, which is hereby incorporated by reference as if fully set forth herein.

BACKGROUND OF THE DISCLOSURE

Field of the Disclosure

The present disclosure relates to a brake device applicable to a vehicle and the vehicle including the same, and more particularly to a brake device capable of evenly distributing pressure on one surface of a brake pad through a balance bar to which a plurality of pressurizing portions (hereinafter referred to as "pressurizers") is coupled, and a vehicle including the brake device.

Discussion of the Related Art

A brake device mounted in a vehicle is a device for decelerating, stopping, or maintaining a stopped state of a vehicle while driving and is located inside a rotating wheel, and brakes a vehicle by strongly pressing a disc-shaped brake disc rotating together with the wheel using brake pads from both sides.

In a general brake device, one brake pad is generally pushed by one piston to pressurize a brake disc, but there are also cases where the brake pad is pushed by two or more pistons.

When one brake pad is pushed by a plurality of pistons, applying uniform pressure to the respective pistons is of importance to brake performance. This is because the brake pad can more evenly apply pressure to the brake disc when the pressure is more evenly distributed on the entire surface of the brake pad.

However, when uneven wear occurs on the brake pad and a slope is formed at the surface of the brake pad, there is a problem that a difference in pressure acting between the plurality of pistons occurs. In other words, excessive pressure may be applied to a specific piston, which may increase the possibility of damage to the piston and may also deteriorate brake performance.

In addition, excessive pressure may be applied to any one of the plurality of pistons due to other factors such as manufacturing tolerances of the actuator designed to push such pistons, such that the problem in which pressure is unevenly distributed on the surface of the brake pad becomes more serious.

Since the above-described problems affect performance of the brake device, there is a need to develop improved technology.

SUMMARY OF THE DISCLOSURE

Accordingly, embodiments of the present disclosure are directed to a brake device and a vehicle including the same that substantially obviate one or more problems due to limitations and disadvantages of the related art.

An object of the present disclosure is to provide a brake device that can improve surface pressure of a brake pad by evenly distributing pressure on one surface of a brake pad through a balance bar to which a plurality of pressurizers is coupled, and a vehicle including the brake device.

Another object of the present disclosure is to provide a brake device that enables a balance bar to be rotatably coupled to one side of a conversion assembly to prevent force from being concentrated on a plurality of pressurizers through rotation of the balance bar, and thus reduces the possibility of damage to the balance bar, and a vehicle including the brake device.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a brake device may include a caliper body, a brake pad disposed at one side of the caliper body, and a pad propulsion unit seated in the caliper body to press one surface of the brake pad. The pad propulsion unit includes a conversion assembly configured to convert rotational movement into rectilinear movement, a balance bar rotatably connected to one side of the conversion assembly, and at least two pressurizers coupled to the balance bar and coming into contact with the one surface of the brake pad.

The balance bar may be configured to be rotatable based on a rotation center point located in the conversion assembly.

The conversion assembly may include: a bolt screw configured to rotate; and a moving nut connected to the bolt screw, wherein the moving nut moves forward or backward by rotation of the bolt screw.

The moving nut may include a head configured to have a curved surface at one side thereof, and the balance bar may include a connection surface formed with a curved surface corresponding to the curved surface of the head.

The brake device may further include a gap formed between the one side of the conversion assembly and one side of the connection surface.

The moving nut may include a stopper rib formed at an outer surface thereof, and the balance bar may include a first stopper groove contacting the stopper rib.

The at least two pressurizers may be spaced part from each other in a first direction at a center of the balance bar, and may be symmetrically coupled to each other.

The at least two pressurizers may be spaced part from each other in a second direction perpendicular to the first direction at a center of the balance bar, and may be symmetrically coupled to each other.

The brake device may further include a back plate disposed between the one surface of the brake pad and the balance bar. The back plate includes a stopper protrusion formed at one side thereof; and the at least two pressurizers include at least one second stopper groove contacting the stopper protrusion.

In accordance with another aspect of the present disclosure, a vehicle may include a vehicle body; at least one wheel configured to rotate while being located at a lower portion of the vehicle body; a brake disc configured to rotate with the wheel by coupling to the wheel; a caliper body into which one end of the brake disc is inserted; a brake pad disposed at one side of the caliper body such that one surface thereof faces the brake disc; and a pad propulsion unit seated in the caliper body to press one surface of the brake pad. The pad propulsion unit may include a conversion assembly configured to convert rotational movement into rectilinear movement; a balance bar rotatably connected to one side of the conversion assembly; and at least two pressurizers coupled to the balance bar and coming into contact with the one surface of the brake pad.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Description will now be given in detail according to exemplary embodiments disclosed herein, with reference to the accompanying drawings. The same or equivalent components may be provided with the same reference numbers, and description thereof will not be repeated. As used herein, the suffixes "module" and "part" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, it will be understood that when an element is referred to as being "directly connected with" another element, there are no intervening elements present.

A singular representation may include a plural representation unless it represents a definitely different meaning from the context.

The terms such as "include" or "have" used herein are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Figure 1:
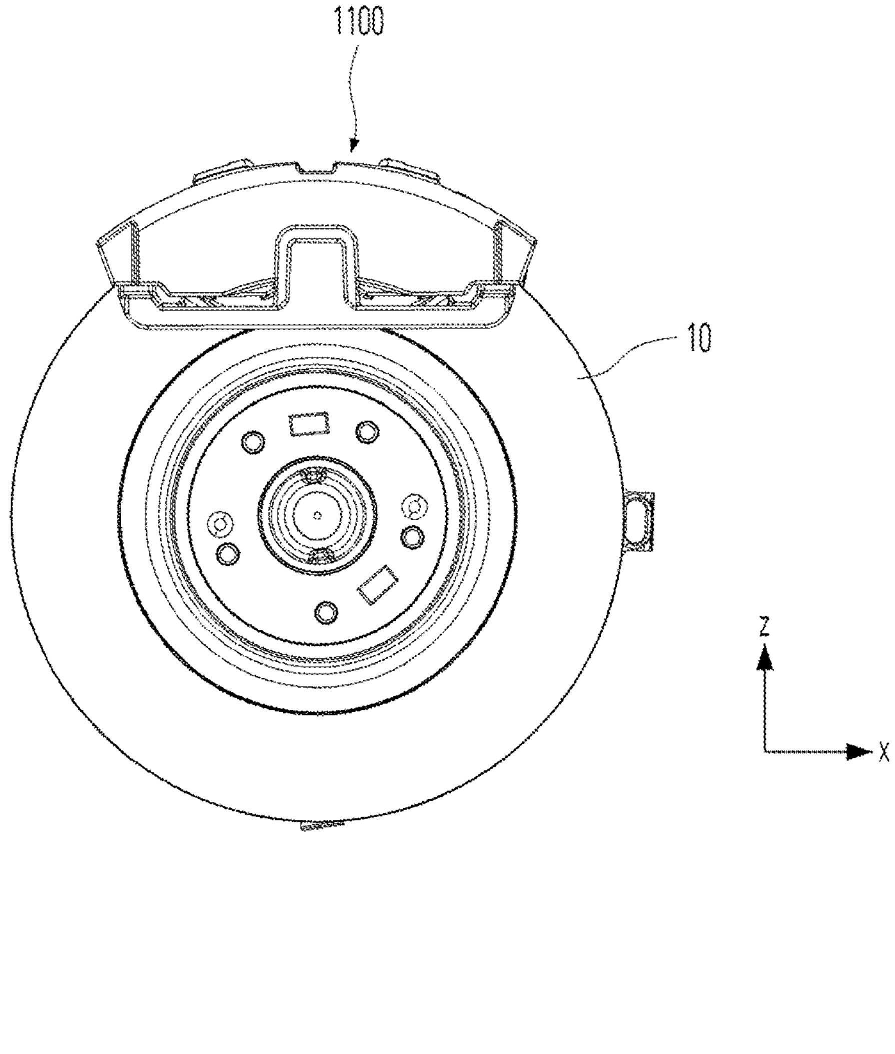
FIG. 1 is a front view illustrating a brake device and a brake disc according to an embodiment of the present disclosure.
Figure 2:
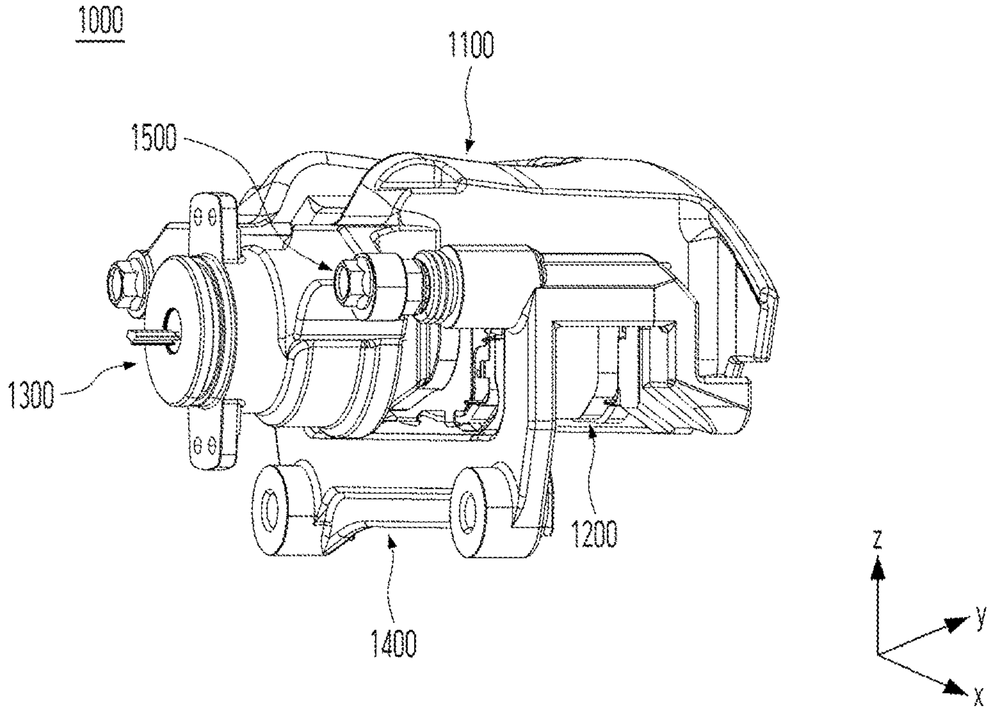
FIG. 2 is a perspective view illustrating the brake device according to an embodiment of the present disclosure.
Figure 3:
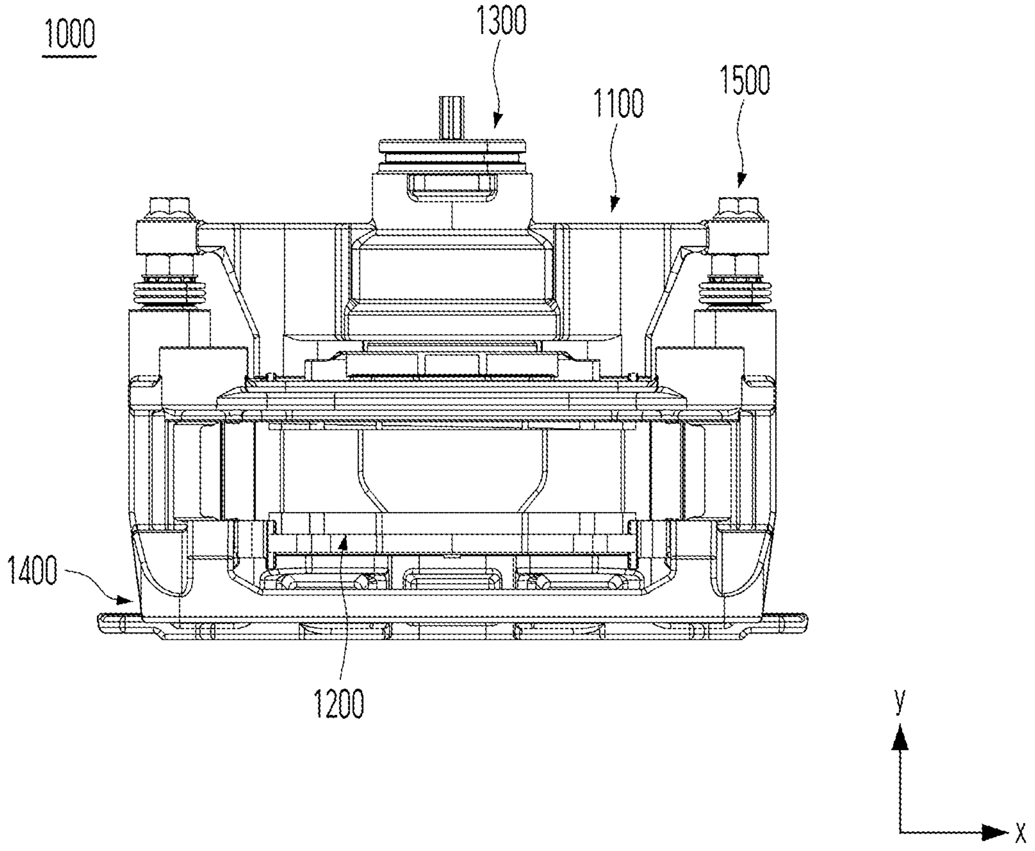
FIG. 3 is a bottom view illustrating the brake device according to an embodiment of the present disclosure.

FIG. 1 is a front view illustrating a brake device 100 and a brake disc 10 according to an embodiment of the present disclosure. FIG. 2 is a perspective view illustrating the brake device 1000 according to an embodiment of the present disclosure. FIG. 3 is a bottom view illustrating the brake device 1000 according to an embodiment of the present disclosure.

Hereinafter, in describing the brake device 1000 according to an embodiment of the present disclosure, the left and right directions will hereinafter be described based on an X-axis direction, the forward and backward directions will hereinafter be described based on a Y-axis direction, and the upper and lower directions will hereinafter be described based on a Z-axis direction.

Wheels of a vehicle are generally arranged on both left and right sides, and the front direction shown in FIG. 1 may be arranged to face the outside of the vehicle. Referring to FIGS. 1 and 2, the brake device 1000 according to the present disclosure may be a device that brakes a vehicle by pressing the brake disc 10 of the vehicle with a brake pad 1200. During driving of the vehicle, the brake disc 10 may rotate with the wheels, and when the brake device 1000 applies pressure to the brake disc 10, the brake device 1000 can reduce the rotation speed of the wheels by applying resistance to rotation of the brake device 10.

Referring to FIGS. 2 and 3, the brake device 1000 according to an embodiment of the present disclosure may include a caliper body 1100, a brake pad 1200, and a pad propulsion unit 1300. In addition, the brake device 1000 according to the present disclosure may further include a pad carrier 1400 and a connection pin 1500.

The caliper body 1100 may be a body to which the constituent components of the brake device 1000 can be connected. The caliper body 1100 may be provided in a shape similar to a "L" shape, so that a portion of the brake disc 10 can be disposed in a recessed area. The caliper body 1100 may have a brake pad 1200 disposed therein so that the caliper body 1100 can press both sides of the brake disc 10. In addition, a pad propulsion unit 1300 that presses one surface of the brake pad 1200 may be seated in the caliper body 1100.

The material and shape of the caliper body 1100 may be determined in various ways by considering the positions, loads, etc. of other components. Preferably, the material of the caliper body 1100 may include a metal-based material. The caliper body 1100 may be made of a metal-based material with appropriate porosity to support a reaction force against a braking clamping force.

A pad carrier 1400 may be connected to the caliper body 1100 and the connection pin 1500, and may also be connected to both sides of the brake pad 1200 to guide the movement of the brake pad 1200. The brake pad 1200 may include protrusions formed on both sides thereof, and the pad carrier 1400 may include grooves corresponding to the protrusions, so that the protrusions of the brake pad 1200 can be inserted into the grooves of the pad carrier 1400.

The groove of the pad carrier 1400 may extend in the direction in which the brake pad 1200 moves to press the brake disc 10. Accordingly, the brake pad 1200 can move while the protrusions on both sides of the brake pad 1200 are guided by the pad carrier 1400.

The pad carrier 1400 may be connected to a fixed component such as a wheel knuckle (not shown), and the caliper body 1100 connected to the pad carrier 1400 may move while being guided in the direction of the connection pin 1500. For example, during a braking operation, the caliper body 1100 may move by the reaction force generated when the brake pad 1200 applies pressure to the brake disc 10. The direction of the connection pin 1500 may be parallel to the direction in which the brake pad 1200 moves.

In addition, the pad carrier 1400 may be made of a metal-based material with appropriate strength to support the braking torque acting on the brake pad 1200.

The brake pad 1200 may include a pad that directly contacts and rubs the brake disc 10, and a back plate connected to one surface of the brake pad 1200. A plurality of brake pads 1200 may be provided, and in this case, the first brake pad 1200 may press one side of the brake disc 10, and the second brake pad 1200 may press the other side of the brake disc 10. Two brake pads 1200 corresponding to one pair of brake pads 1200 may be arranged to face each other with the brake disc 10 interposed therebetween.

Although not shown in the drawings, the brake device 1000 according to an embodiment of the present disclosure may include a motor for driving the pad propulsion unit 1300 and a gear unit composed of gears connected to the motor. The operation of the motor may be controlled based on electrical signals, and when the motor is operated, the rotational movement of the motor may be transmitted to the pad propulsion unit 1300 through the gear unit.

The gear unit may be comprised of an assembly of a plurality of gears for transmitting the rotational movement of the motor. The plurality of gears may be connected to a motor gear, and the types, numbers, positions, and sizes of the plurality of gears may include various structures designed by those skilled in the art. The plurality of gears may be comprised of a combination of various types of gears, such as spur gears, helical gears, and worm gears.

Figure 4:
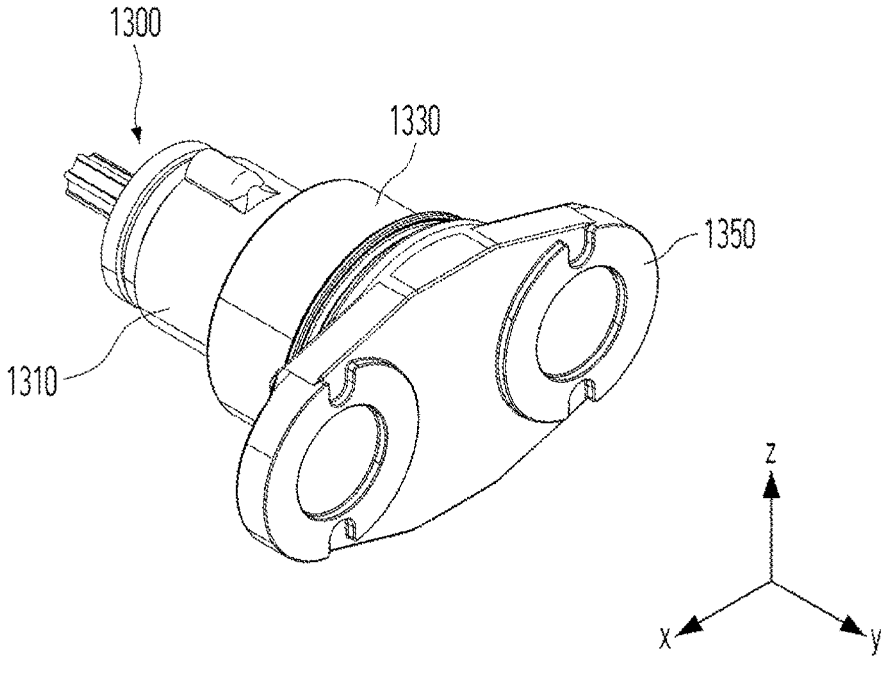
FIG. 4 is a perspective view illustrating a pad propulsion unit of the brake device according to an embodiment of the present disclosure.
Figure 5:
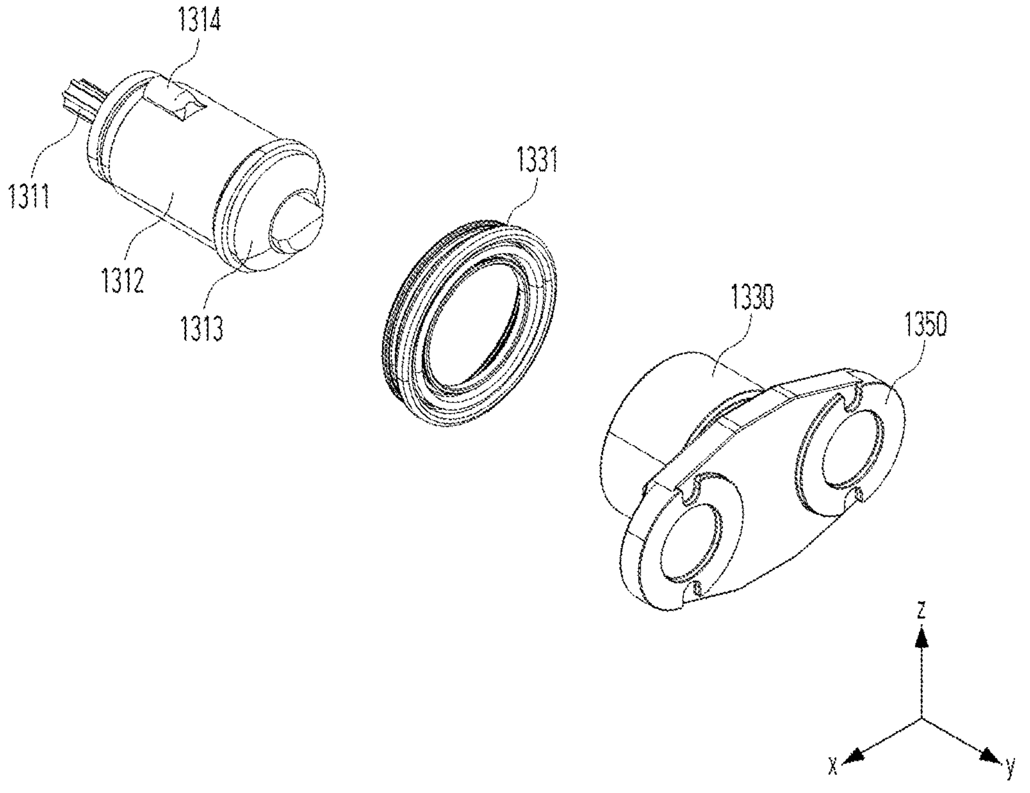
FIG. 5 is an exploded view illustrating a pad propulsion unit of the brake device according to an embodiment of the present disclosure.
Figure 6:
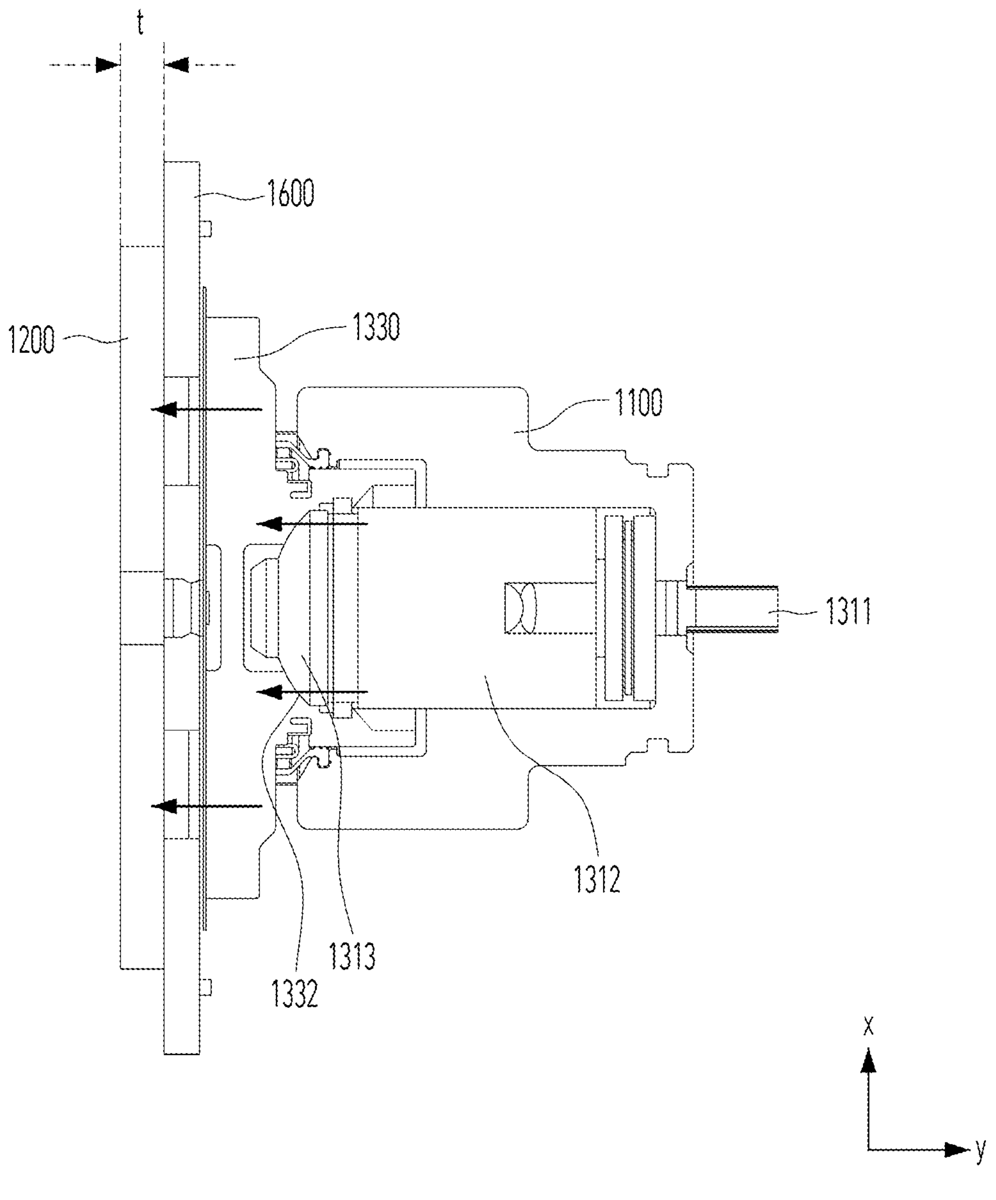
FIG. 6 is a side cross-sectional view illustrating the brake device according to an embodiment of the present disclosure.

FIG. 4 is a perspective view illustrating the pad propulsion unit 1300 of the brake device 1000 according to an embodiment of the present disclosure. FIG. 5 is an exploded view illustrating the pad propulsion unit 1300 of the brake device 1000 according to an embodiment of the present disclosure. FIG. 6 is a side cross-sectional view illustrating the brake device 1000 according to an embodiment of the present disclosure.

In the brake device 1000 according to the embodiment of the present disclosure, the pad propulsion unit 1300 may receive power from the above-described gear unit, and may press and move the brake pad 1200. Here, the pad propulsion unit 1300 may include a conversion assembly 1310, a balance bar 1330, and a pressurizer 1350.

First, the conversion assembly 1310 may include various components that can convert the rotational movement of the gear into the rectilinear movement, and a connection means between the components. For example, in the brake device 1000 according to the embodiment of the present disclosure, the conversion assembly 1310 may include a bolt screw 1311 and a moving nut 1312 corresponding thereto.

The bolt screw 1311 may engage with a gear connected to the above-described motor and can rotate around a shaft. Here, referring to FIGS. 2 and 3, the rotary shaft of the bolt screw 1311 may be disposed parallel to the direction (Y-axis direction) in which the brake pad 1200 moves. In addition, the bolt screw 1311 may include a spiral screw (thread) formed at the outer surface thereof.

The moving nut 1312 may include a screw corresponding to the screw of the bolt screw 1311, and may be connected to the bolt screw 1311. In addition, the moving nut 1312 can move linearly by rotation of the bolt screw 1311. Here, the moving nut 1312 may move forward or backward (y-axis direction) depending on the rotation direction of the bolt screw 1311. Accordingly, the bolt screw 1311 may be formed to be longer than the length of the moving nut 1312 in order to secure a movement area in which the moving nut 1312 moves forward or backward (y-axis direction).

Here, the moving nut 1312 may be referred to as a ball screw nut, and the structure of the bolt screw 1311 and the moving nut 1312 may be referred to as a ball screw structure.

In particular, the moving nut 1312 may include a head 1313 including a curved surface on one side thereof, and a stopper rib 1314 may be formed on the outer surface of the moving nut 1312. A more detailed description thereof will be given later.

The balance bar 1330 may be rotatably connected to one side of the conversion assembly 1310, and more specifically, may be rotatably connected to a head 1313 of the moving nut 1312.

In particular, the balance bar 1330 may include a connection surface 1332 having a curved surface corresponding to the curved surface of the head 1313 of the moving nut 1312. As a result, the balance bar 1330 can rotate based on a rotation center point 1315 located in the conversion assembly 1310. A more detailed description thereof will hereinafter be given later.

The brake device 1000 according to the embodiment of the present disclosure may include a gap formed between the one side of the conversion assembly 1310 and the connection surface 1332. As a result, when connecting the conversion assembly 1310 and the balance bar 1330, interference with the components of the brake device 10000 can be avoided.

In addition, the gap formed between one side of the conversion assembly 1310 and the connection surface 1332 serves to secure the rotation area of the balance bar 1330 when the balance bar 1330 rotates on one side of the conversion assembly 1310.

At least two pressurizers 1350 may be coupled to the balance bar 1330. In addition, the balance bar 1330 may further include a boot 1331 that blocks the gap with the caliper body 1100 to prevent foreign substances from entering from the outside.

Figure 7:
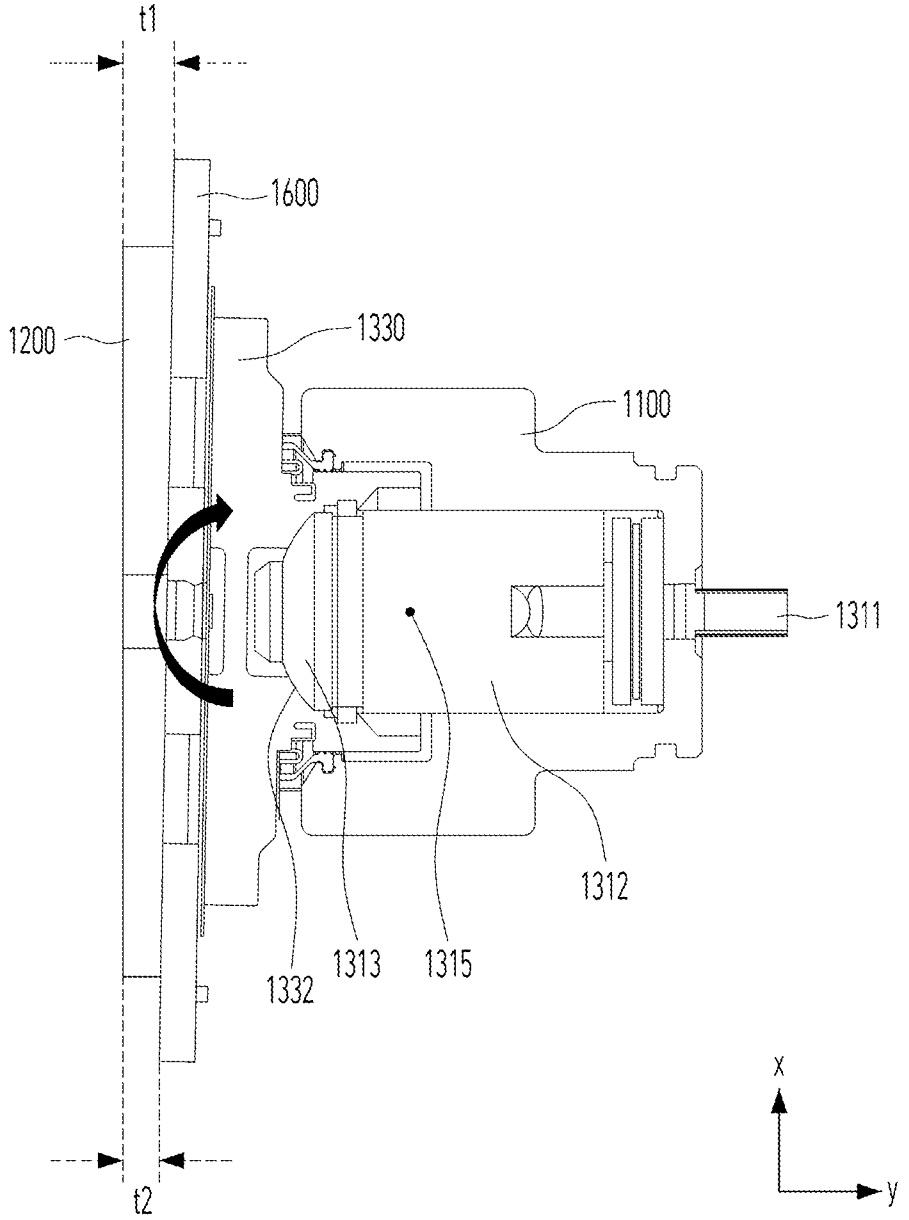
FIGS. 7 and 8 are diagrams for specifically explaining rotation of a balance bar in the brake device according to an embodiment of the present disclosure.
Figure 8:
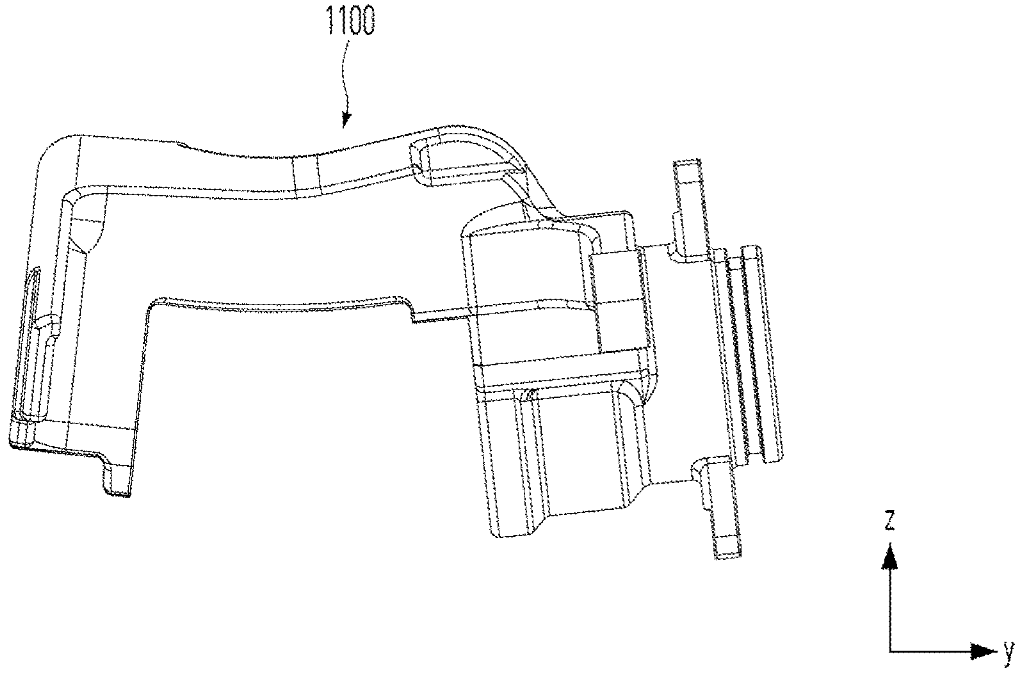

FIGS. 7 and 8 are diagrams for specifically explaining rotation of the balance bar 1330 in the brake device 1000 according to an embodiment of the present disclosure. FIG.

7 is a diagram for explaining the rotation of the balance bar 1330 when uneven wear occurs on the surface of the brake pad 1200, and FIG. 8 is a diagram for explaining the balance bar 1330 when deformation of the caliper body 1100 occurs.

First, referring to FIG. 6, when a thickness (t) of the brake pad 1200 is constant, that is, when no uneven wear occurs on the surface of the brake pad 1200, pressure generated by the plurality of pressurizers 1350 can be evenly applied to the entire surface of the brake pad 1200 even when the balance bar 1330 linearly moves through the rectilinear movement of the conversion assembly 1310.

On the other hand, as shown in FIG. 7, when uneven wear occurs on the surface of the brake pad 1200 and the thickness of the brake pad 1200 is different, that is, when t1 and t2 shown in FIG. 7 are different from each other, pressure is unevenly distributed on the surface of the brake pad 1200 as described above.

Therefore, when the balance bar 1330 linearly moves due to an inclination formed on the surface of the partially worn brake pad 1200, a difference in pressure acting between the plurality of pressurizers 1350 may occur.

In addition, as described above, excessive pressure may be applied to a specific pressurizer 1350, and the possibility of damage to the balance bar 1330 may increase, so that performance of the brake designed to brake the vehicle can be deteriorated.

In addition, this problem may also appear when the caliper body 1100 is deformed. For example, as shown in FIG. 8, when the balance bar 1330 moves linearly as one side of the caliper body 1100 is bent, pressure is unevenly applied to the entire surface of the brake pad 1200 by a plurality of pressurizers 1350. In addition, there may be a difference in the pressure acting between the plurality of pressurizers 1350, which may increase the possibility of damage to the balance bar 1330 as described above.

Accordingly, the brake device 1000 according to the embodiment of the present disclosure aims to solve the above-mentioned problem through the balance bar 1330 rotatably connected to one side of the conversion assembly 1310.

Accordingly, in the brake device 1000 according to the embodiment of the present disclosure, the balance bar 1330 may be rotatably connected to one side of the conversion assembly 1310. More specifically, the balance bar 1330 may be rotatable around a rotation center point 1315 located in the conversion assembly 1310.

Since the balance bar 1330 can rotate based on the rotation center point 1315 located in the conversion assembly 1310, for example, when uneven wear occurs on the surface of the brake pad 1200 as shown in FIG. 7, the balance bar 1330 can rotate left and right (X-axis direction).

As another example, as shown in FIG. 8, when the caliper body 1100 is deformed, the balance bar 1330 may rotate in the vertical direction (Z-axis direction).

That is, the balance bar 1330 is rotatable at one side of the conversion assembly 1310 in response to the uneven wear phenomenon that occurs on the surface of the brake pad 1200 or the deformation of the caliper body 1100, so that a difference in pressure acting between the plurality of pressurizers 1350 can be minimized. Through this, pressure can be applied evenly to the entire surface of the brake pad 1200, and damage to the balance bar 1330 can be prevented to maintain performance of the brake designed to brake the vehicle.

In addition, in order to allow the balance bar 1330 to rotate at one side of the conversion assembly 1310, the brake device 1000 according to the embodiment of the present disclosure may enable the moving nut 1312 to include a head 1313 including a curved surface, and may enable the balance bar 1330 to include a connection surface 1334 having the curved surface corresponding to the curved surface of the head 1313.

The curved surface formed on the head 1313 of the moving nut 1312 may be in contact with the curved surface formed on the connection surface 1334 of the balance bar 1330, so that the two curved surfaces can rotate around the rotation center point 1315.

In addition, the brake device 1000 according to the embodiment of the present disclosure can secure a rotation area of the balance bar 1330 when the balance bar 1330 rotates at one side of the conversion assembly 1310 through a gap formed at one side of the conversion assembly 1310 and one side of the connection surface 1334, thereby enabling flexible movement of the balance bar 1330.

Figure 9:
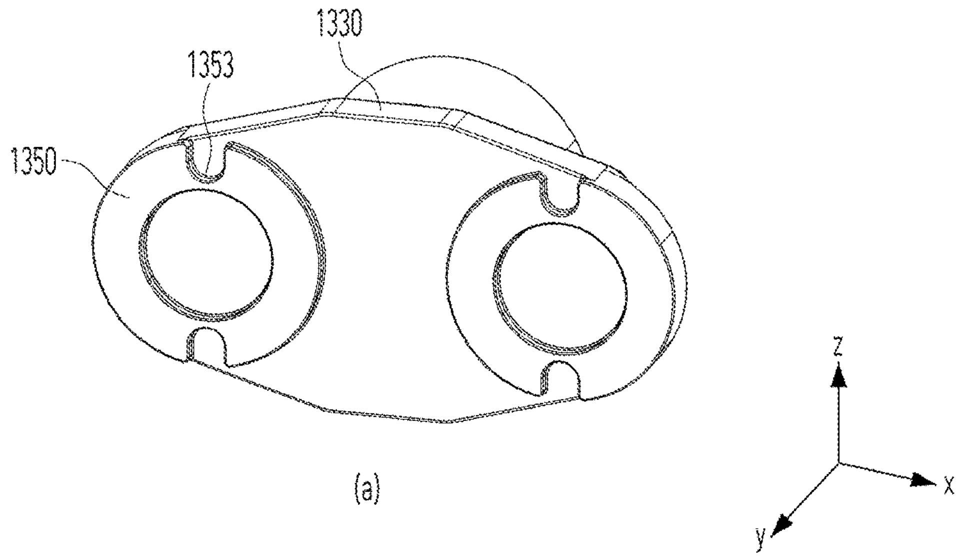
FIG. 9 is a diagram illustrating a pressurizer of a brake device according to an embodiment of the present disclosure.
Figure 9:
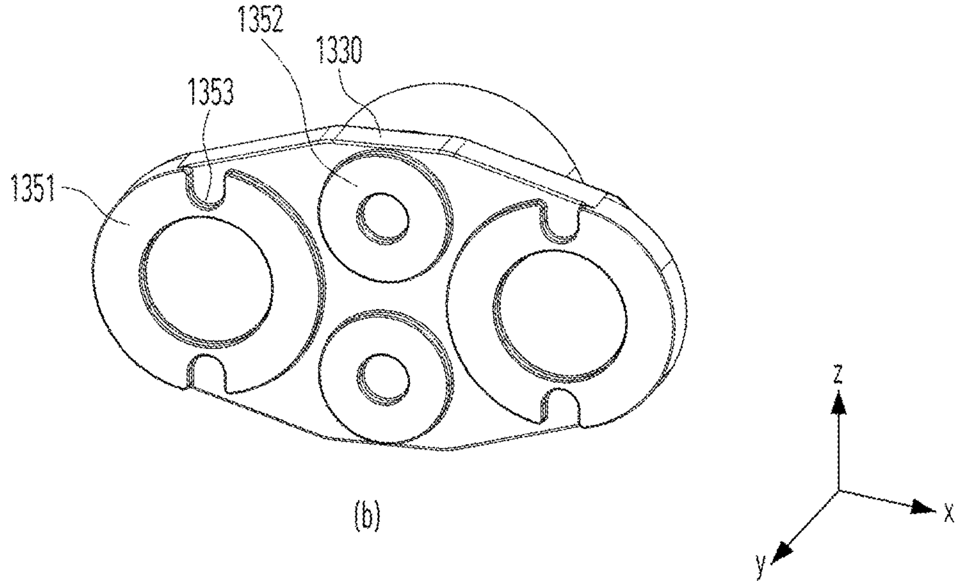
Figure 10:
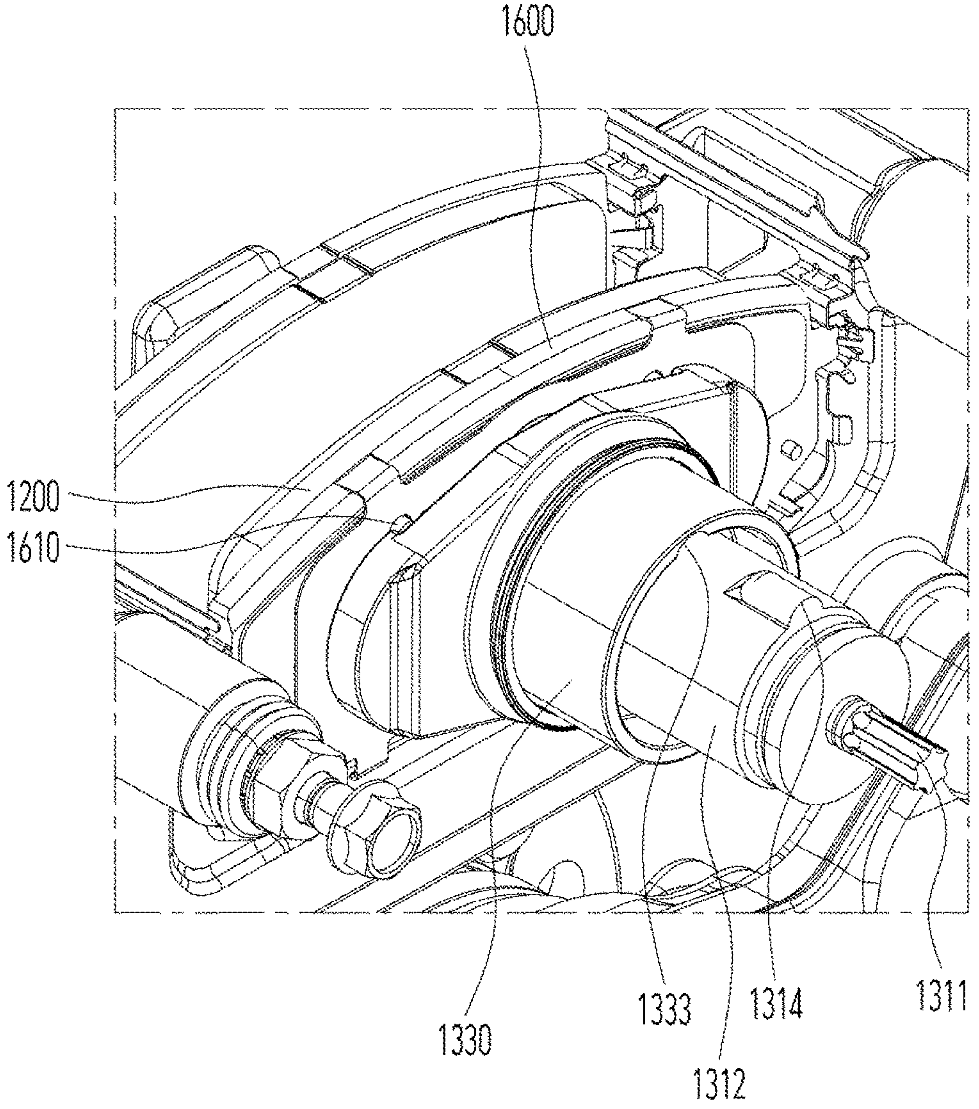
FIGS. 10 and 11 are diagrams for explaining movement of a balance bar and a moving nut through a stopper protrusion and a stopper rib in the brake device according to an embodiment of the present disclosure.
Figure 11:
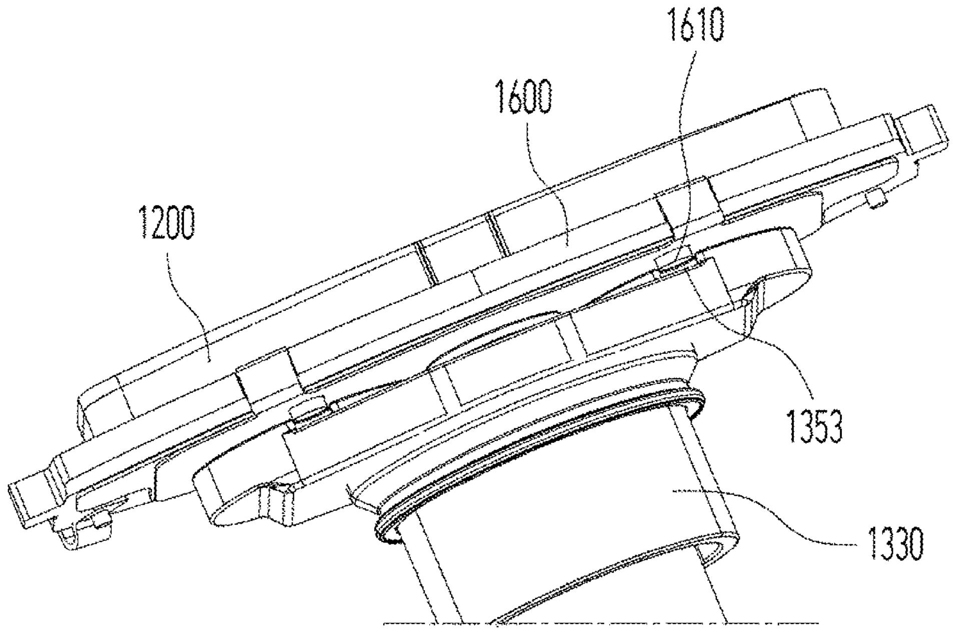

FIG. 9 is a diagram illustrating the pressurizer 1350 of the brake device 1000 according to an embodiment of the present disclosure. FIGS. 10 and 11 are diagrams for explaining movement of the balance bar 1330 and the moving nut 1312 through a stopper protrusion 1610 and a stopper rib 1314 in the brake device 1000 according to an embodiment of the present disclosure.

The brake device 1000 according to the embodiment of the present disclosure may include at least two pressurizers 1350 that are in contact with one surface of the brake pad 1200 by connecting to the balance bar 1330. In addition, at least two pressurizers 1350 may press one surface of the brake pad 1200 with uniform force.

Here, as shown in FIG. 9(*a*), at least two pressurizers 1350 may be disposed symmetrically and spaced apart from each other in the first direction (X-axis direction) at the center of the balance bar 1330. As a result, one surface of the brake pad 1200 can be pressed with uniform force.

According to another embodiment of the present disclosure, as shown in FIG. 9(*b*), at least two pressurizers 1350 may be spaced apart from each other in a second direction (Z-axis direction) perpendicular to the first direction at the center of the balance bar 1330, so that the at least two pressurizers 1350 can be disposed symmetrical to each other.

For convenience of description, the pressurizers 1350, which are spaced apart from each other in the first direction (X-axis direction) and are symmetrical to each other, may hereinafter be referred to as the first pressurizers 1351, and the pressurizers 1350, which are spaced apart from each other in the second direction (Z-axis direction) and are symmetrical to each other, may hereinafter be referred to as the second pressurizers 1352.

As the distance between the first pressurizers 1351 disposed spaced apart from each other in the first direction (X-axis direction) at the center of the balance bar 1330 increases, the moment formed in the balance bar 1330 increases. Therefore, it is necessary to control the increase in moment formed in the balance bar 1330.

To this end, the brake device 1000 according to the embodiment of the present disclosure may further include second pressurizers 1352 located symmetrical to each other and spaced apart from each other in the second direction (Z-axis direction) at the center of the balance bar 1330, so that the pressing area for pressing the brake pad 1200 at the center of the balance bar 1330 can be increased. As a result, the moment formed in the balance bar 1330 can be reduced. Therefore, the possibility of damage to the balance bar 1330 can be reduced.

Referring to FIGS. 9 to 11, the brake device 1000 according to the embodiment of the present disclosure may further include a back plate 1600 disposed between one surface of the brake pad 1200 and the balance bar 1330. The back plate 1600 may include a stopper protrusion 1610 formed at one surface thereof, and the at least two pressurizers 1350 described above may include second stopper grooves 1353 contacting the stopper protrusion 1610.

The above-described components are configured to prevent the pressing region caused by the plurality of pressurizers 1350 coupled to the balance bar 1330 in a process of rotating the balance bar 1330 at one side of the conversion assembly 1310 from deviating from the area at which the brake pad 1200 is located.

That is, in order for the plurality of pressurizers 1350 to apply pressure evenly to the entire surface of the brake pad 1200, the brake device 1000 according to the embodiment of the present disclosure may include the stopper protrusion 1610 and the second stopper grooves 1353 contacting the stopper protrusion 1610, so that the brake device 1000 can prevent the pressing area caused by the plurality of pressurizers 1350 from deviating from the area at which the brake pad 1200 is located.

In addition, as shown in FIG. 9(*b*), when the first pressurizers 1351 and the second pressurizers 1352 are provided as an example for reducing the moment formed in the balance bar 1330, the second stopper grooves 1353 may be formed in the first pressurizers 1351 in consideration of the rotational shape of the balance bar 1330 described above with reference to FIGS. 7 and 8.

Referring to FIGS. 4 and 5, the brake device 1000 according to the embodiment of the present disclosure may enable the moving nut 1312 to include the stopper rib 1314 formed at the outer surface of the moving nut 1312, and may enable the balance bar 1330 to include a first stopper groove 1333 contacting the stopper rib 1314. In addition, rotation of the moving nut 1312 that moves linearly can be prevented through the stopper rib 1314 and the first stopper groove 1333.

The rotation of the moving nut 1312 is prevented through the stopper rib 1314 and the first stopper groove 1333, so that the pressing area caused by the plurality of pressurizers 1350 described above can be prevented from deviating from the area at which the brake pad 1200 is located.

That is, in order to evenly apply pressure to the entire surface of the brake pad 1200 through the balance bar 1330 coupled to the plurality of pressurizers 1350, the brake device 1000 according to the embodiment of the present disclosure may include the stopper protrusion 1610 and the second stopper groove 1353, or may include the stopper rib 1314 and the first stopper groove 1333. As a result, the brake device 1000 can prevent the pressing area caused by the plurality of pressurizers 1350 from deviating from the area at which the brake pad 1200 is located.

Summarizing the above, the brake device and the vehicle including the same according to the embodiments of the present disclosure can improve the surface pressure of the brake pad by evenly distributing pressure to one surface of the brake pad through the balance bar coupled to the plurality of pressurizers. In addition, the balance bar is rotatably connected to one side of the conversion assembly to prevent force from being concentrated at the plurality of pressurizers through rotation of the balance bar, thereby reducing the possibility of damage to the balance bar.

As is apparent from the above description, the brake device and the vehicle including the same according to the embodiments of the present disclosure can improve the surface pressure of the brake pad by evenly distributing pressure on one surface of the brake pad through the balance bar to which a plurality of pressurizers is coupled.

In addition, the balance bar is rotatably connected to one side of the conversion assembly to prevent force from being concentrated on the plurality of pressurizers through rotation of the balance bar, thereby reducing the possibility of damage to the balance bar.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A brake device comprising:

a caliper body;

a brake pad disposed at one side of the caliper body; and a pad propulsion unit seated in the caliper body to press one surface of the brake pad, wherein the pad propulsion unit includes:

a conversion assembly configured to convert rotational movement into rectilinear movement;

a balance bar rotatably connected to one side of the conversion assembly;

at least two pressurizers coupled to the balance bar and coming into contact with the one surface of the brake pad; and a back plate disposed between the one surface of the brake pad and the balance bar, wherein the back plate includes a stopper protrusion formed at one surface thereof and the at least two pressurizers include a second stopper groove contacting the stopper protrusion.

2. The brake device according to claim 1, wherein:

the balance bar is configured to be rotatable based on a rotation center point located in the conversion assembly.

3. The brake device according to claim 2, wherein the conversion assembly includes:

a bolt screw configured to rotate; and a moving nut connected to the bolt screw, wherein the moving nut moves forward or backward by rotation of the bolt screw.

4. The brake device according to claim 3, wherein:

the moving nut includes a head configured to have a curved surface at one side thereof; and the balance bar includes a connection surface formed with a curved surface corresponding to the curved surface of the head.

5. The brake device according to claim 4, further comprising:

a gap formed between the one side of the conversion assembly and one side of the connection surface.

6. The brake device according to claim 3, wherein:

the moving nut includes a stopper rib formed at an outer surface thereof; and the balance bar includes a first stopper groove contacting the stopper rib.

7. The brake device according to claim 1, wherein:

the at least two pressurizers are spaced part from each other in a first direction at a center of the balance bar, and are symmetrically coupled to each other.

8. The brake device according to claim 7, wherein:

the at least two pressurizers are spaced part from each other in a second direction perpendicular to the first direction at a center of the balance bar, and are symmetrically coupled to each other.

9. A vehicle comprising:

a vehicle body;

at least one wheel configured to rotate while being located at a lower portion of the vehicle body;

a brake disc configured to rotate with the wheel by coupling to the wheel;

a caliper body into which one end of the brake disc is inserted;

a brake pad disposed at one side of the caliper body such that one surface thereof faces the brake disc; and a pad propulsion unit seated in the caliper body to press one surface of the brake pad, wherein the pad propulsion unit includes a conversion assembly configured to convert rotational movement into rectilinear movement;

a balance bar rotatably connected to one side of the conversion assembly;

at least two pressurizers coupled to the balance bar and coming into contact with the one surface of the brake pad; and a back plate disposed between the one surface of the brake pad and the balance bar, wherein the back plate includes a stopper protrusion formed at one surface thereof and the at least two pressurizers include a second stopper groove contacting the stopper protrusion.

* * * * *